(12) United States Patent
Keahey et al.

(10) Patent No.: US 11,222,038 B2
(45) Date of Patent: Jan. 11, 2022

(54) GENERATING AN OUTSIDE-IN HIERARCHICAL TREE VISUALIZATION

(71) Applicant: International Business Machines Corporation, Armonk, NY (US)

(72) Inventors: Thomas Alan Keahey, Naperville, IL (US); Daniel Jay Rope, Reston, VA (US); Graham John Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 15/235,824

(22) Filed: Aug. 12, 2016

(65) Prior Publication Data

US 2018/0046690 A1 Feb. 15, 2018

(51) Int. Cl.
*G06F 16/26* (2019.01)
*G06F 16/904* (2019.01)

(52) U.S. Cl.
CPC ............ *G06F 16/26* (2019.01); *G06F 16/904* (2019.01)

(58) Field of Classification Search
CPC ......... G06F 17/30572; G06F 17/30554; G06F 17/3053; G06F 17/30601; G06F 17/30958; G06F 17/30696; G06F 17/30991; G06F 17/30126; G06F 17/30265; G06F 17/3028; G06F 17/30327; G06F 17/30598; G06F 17/30769; G06F 16/248; G06F 16/26; G06F 16/904; G06F 11/323; G06F 16/9024; G06F 16/185; G06F 3/04845; G06T 11/206; G06T 11/001

USPC ... 707/999.003, E17.108, E17.011, E17.014, 707/E17.031, E17.032, E17.082, E17.093, 707/E17.119, E17.141, 741; 715/855, 715/273, 713, 762, 853
See application file for complete search history.

(56) References Cited

U.S. PATENT DOCUMENTS

| | | | |
|---|---|---|---|
| 6,549,219 B2 * | 4/2003 | Selker | G06F 3/0482 345/902 |
| 7,667,701 B2 | 2/2010 | Leah et al. | |
| 9,021,397 B2 | 4/2015 | Ramsay et al. | |

(Continued)

OTHER PUBLICATIONS

Shneideman, "Tree Visualization with Tree-Maps: 2-d Space-Filling Approach", ACM Transactions on graphics (TOG) 11.1, 1992, 8 pages.

(Continued)

*Primary Examiner* — Alford W Kindred
*Assistant Examiner* — Cecile H Vo
(74) *Attorney, Agent, or Firm* — William H. Hartwell

(57) ABSTRACT

A data visualization tool ("tool") configured to generate a visualization for tree data. The tool can calculate a number of hierarchical levels of the tree data. The tool can further subdivide a presentation area for the data visualization into a number of concentric parts. The concentric parts are equivalent to the number of hierarchical levels. Each of the concentric parts corresponds to one of the hierarchical levels. Further, the tool can graphically generate the data visualization for presentation via an electronic display. A first of the concentric parts that corresponds to a highest of the hierarchal levels is an outermost one of the concentric parts in the presentation area. Each successive concentric part inward corresponds to a next lower hierarchical level.

20 Claims, 9 Drawing Sheets

(56) References Cited

U.S. PATENT DOCUMENTS

| | | | | |
|---|---|---|---|---|
| 2008/0307369 A1* | 12/2008 | Liu | ................... | G06T 11/206 |
| | | | | 715/855 |
| 2012/0240064 A1* | 9/2012 | Ramsay | ............... | G06T 11/00 |
| | | | | 715/762 |
| 2013/0113820 A1* | 5/2013 | Molesky | ............... | G06T 11/00 |
| | | | | 345/592 |
| 2014/0365389 A1* | 12/2014 | Cheek | ............... | G06Q 10/105 |
| | | | | 705/320 |
| 2015/0363051 A1 | 12/2015 | Yao et al. | | |

OTHER PUBLICATIONS

Stasko, et al., "Focus+ context display and navigation techniques for enhancing radial, space-filling hierarchy visualizations". Information Visualization, 2000. InfoVis2000. IEEE Symposium, 2000, 13 pages.

Teelink, et al., "Improving the computer forensic analysis process through visualization", Communications of the ACM 49.2, 2006, 5 pages.

Webber, et al., "Space-filling Techniques in Visualizing Output from Computer Based Economic Models", obtained at http://ideas. repec. org/p/sce/scecfa/67. html, 2006, 7 pages.

"Tree tunnel visualization", Google Search, retrieved from the Internet on Sep. 14, 2020, 3 pages.

Nanni, Dan, "How to visualize disk usage on Linux", Xmodulod, Last updated on Oct. 7, 2013, 11 pages, retrieved from the Wayback Machine Internet Archive.

* cited by examiner

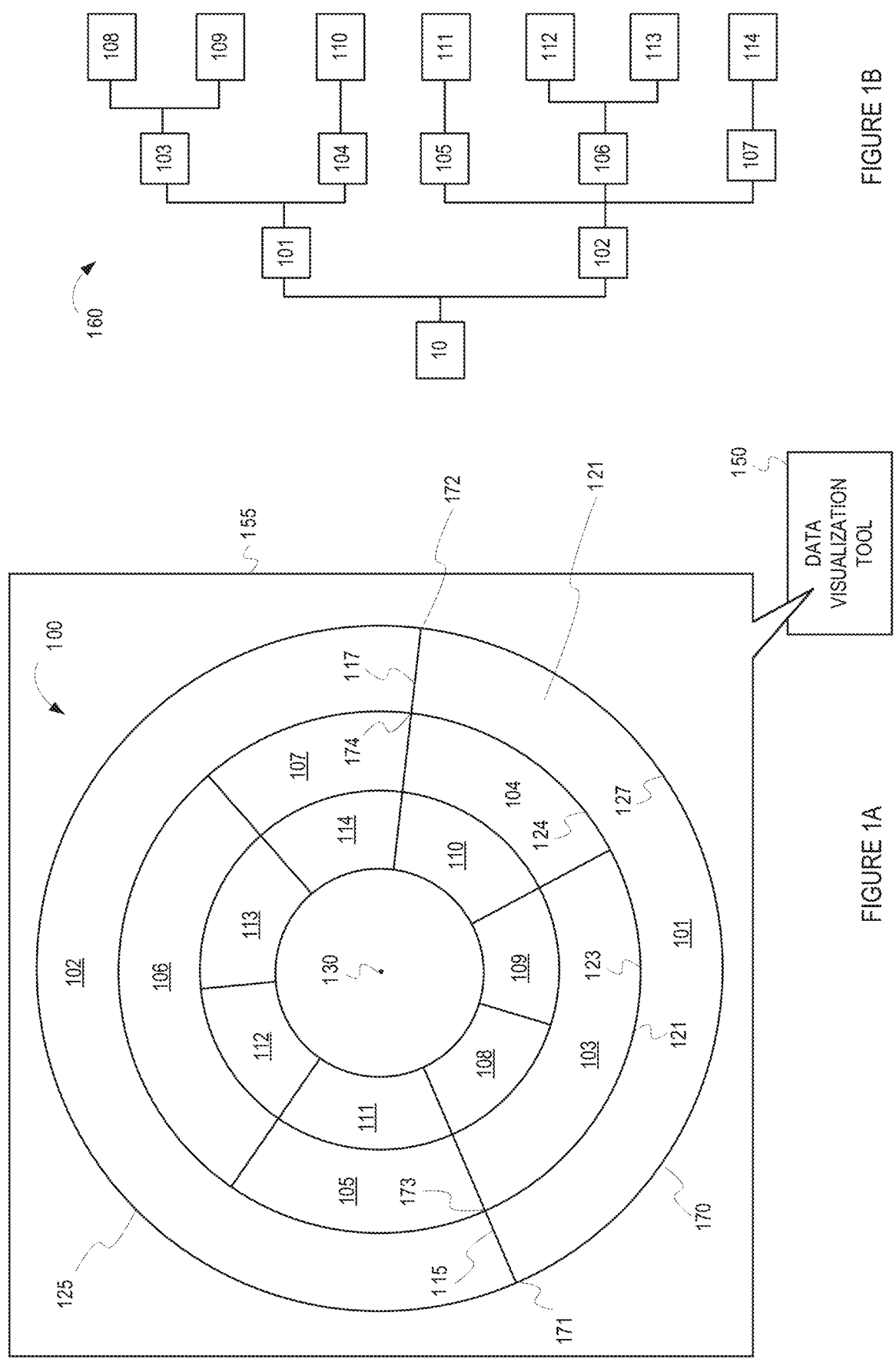

GENERATING AN OUTSIDE-IN HIERARCHICAL TREE VISUALIZATION

BACKGROUND

Embodiments of the inventive subject matter generally relate to the field of computers, and, more particularly, to generating a data visualization.

Data visualization, also referred to as information visualization, involves visually representing abstracted information. Data visualization can utilize various types of techniques, including graph drawings, plots, information graphics, tables, charts, histograms, networks, treemaps, sunbursts, etc. However, current data visualization techniques have challenges, such as presenting hierarchical data compactly, uniformly, and in a way that emphasizes any given level of a hierarchy in a confined space for easy comparison.

SUMMARY

A data visualization tool ("tool") configured to generate a visualization for tree data. The tool can calculate a number of hierarchical levels of the tree data. The tool can further subdivide a presentation area for the data visualization into a number of concentric parts. The concentric parts are equivalent to the number of hierarchical levels. Each of the concentric parts corresponds to one of the hierarchical levels. Further, the tool can graphically generate the data visualization for presentation via an electronic display. A first of the concentric parts that corresponds to a highest of the hierarchal levels is an outermost one of the concentric parts in the presentation area. Each successive concentric part inward corresponds to a next lower hierarchical level.

BRIEF DESCRIPTION OF THE DRAWINGS

The present embodiments may be better understood, and numerous objects, features, and advantages made apparent to those skilled in the art by referencing the accompanying drawings.

FIG. 1A depicts an example of an outside-in hierarchical tree visualization (tree tunnel 100).

FIG. 1B depicts an example tree 160 associated with tree tunnel 100.

DESCRIPTION OF EMBODIMENT(S)

Figure 1C:
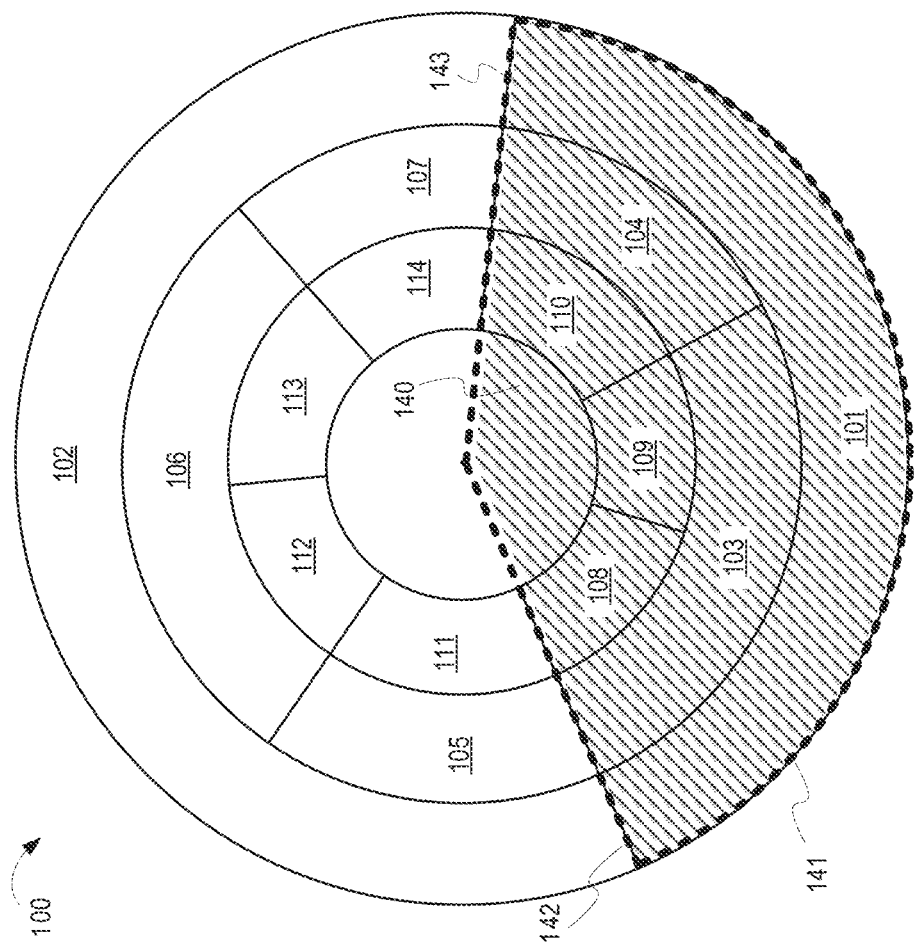
FIG. 1C further depicts the tree tunnel 100.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Disclosed are examples of a tool to generate a new type of visualization for hierarchical data that compresses the hierarchical structure of the data into a fixed space bounded by the highest depth level of the hierarchy. The bounded space is a shape that can be divided into concentric parts, such as a circle, a regular polygon, a regular polyhedral, etc. The outermost concentric part of the shape comprises the highest-level node (e.g., a root node) of a hierarchical data set. Each successive concentric part inward corresponds to a next lower hierarchical depth level. Each of the successive concentric parts subdivides and compresses child nodes in an inward fashion. Thus, the lowest level nodes (e.g., the leaf nodes) are compressed into the inner most portion of the bounded space. This structure for the new type of visualization may be referred to as an outside-in hierarchical tree visualization. The inward, compressed visualization of successive nodes can constrain the complexity and size of data visualization. The new visualization can further provide a compact and scalable representation of the data and convey a uniform sense of depth direction and distance in a hierarchy. Furthermore, the new visualization can preserve a linear path from each parent through all descendent nodes. In addition, the new visualization can place leaf nodes close together for easy comparison. The new visualization can also compress deep hierarchies into a fixed space, thus preventing them from expanding beyond constrained boundaries. Furthermore, the new visualization allows levels in the hierarchy to be variably sized via interaction or algorithm to highlight different depth levels in the tree.

FIG. 1A depicts an example of a specific outside-in hierarchical tree visualization called a tree tunnel 100. In FIG. 1A, a data visualization tool ("tool") 150 generates the tree tunnel 100 and provides it for presentation via an electronic display device 155. In some instances, the tool 100 is associated with information graphics software. In the tree tunnel 100, an outside border 125 represents a root node 10 of a tree 160 (shown in FIG. 1B). Nodes 101 and 102 are positioned in an outermost concentric ring 121 of the tree tunnel 100. The outside border 125 defines an outside boundary for the outermost concentric ring 121. The outermost concentric ring 121 represents the next level of nodes at the base of the tree 160 after the root node 10, Each ring inward from there shows a subdivision of subsequent depth levels of the tree 160. For instance, the root node 10 may represent all inventory data for a particular store in a chain of stores (e.g., the root node 10 represents all inventory for a store in a particular city and state of the United States). Node 101 may be a first type of inventory data (e.g., groceries). Node 102 may be a second type of inventory data (e.g., non-groceries). Nodes 103 and 104 are sub-divisions (e.g., sub-categories, sub-classifications, etc.) of the first type of inventory associated with node 101 (e.g., node 103 represents produce and node 104 represents packaged goods). Leaf node 108 and leaf node 109 are sub-divisions of the type of data from node 103 (e.g., node 108 represents organic produce and node 109 represents non-organic produce). Leaf node 110 is a subdivision of the type of data from node 104 (e.g., node 110 represents canned goods). Nodes 105, 106, and 107 are sub-divisions of the second type of inventory data (e.g., node 105 represents clothing, node 106 represents home and beauty products, and node 107 represents seasonal items). Leaf node 111 may represent a type of data of node 105 (e.g., node 11 represents children's clothing). Leaf nodes 112 and 113 may represent types of data from node 106 (e.g., node 112 represents cleaning products and node 113 represents cosmetics). Node 114 may represent a type of data of node 107 (e.g., node 114 represents lawn furniture).

Referring again to FIG. 1A, in the tree tunnel 100 each node has an outside border, an inside border, and two side borders. The outside border of a node is the curved border furthest from the center point 130. The inside border of a node is the curved border closest to center point 130. For instance, node 101 has the outside border 170 (from point 128 to point 129), an inside border 121 (from point 173 to point 174), a side border 115 (from point 171 to point 173) and a side border 117 (from point 172 to point 174). The tool 150 causes each outside border of any child node in the tree tunnel 100 to touch the inside border of its respective parent node. For example, the inside border 121 of the node 101 touches the outside border 123 of node 103 and also touches the outside border 124 of node 104.

Furthermore, the tool 150 can size any tree depth level for the tree tunnel 100 by adjusting the height or thickness of the rings (i.e., by adjusting the distance between the inside and outside borders of some or all nodes) to allow for more levels of the hierarchy.

Figure 1D:
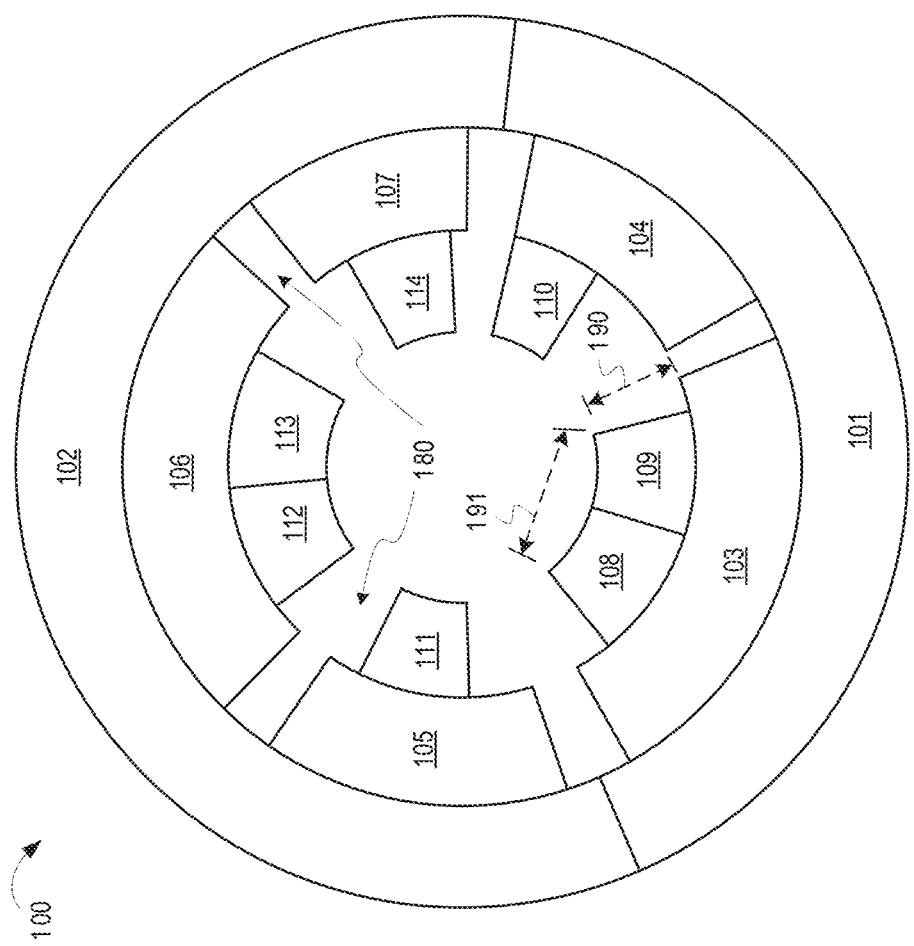
FIG. 1D further depicts the tree tunnel 100 having nodes with modified sizes.

The tool 150 visually compresses all nodes within the tree tunnel 100. For instance, as shown in FIG. 1C node 101 and all of its descendants (i.e., all branch nodes and leaf nodes that originate from node 101) are constrained within the sector 140 bounded, on the outside, by the circular arc 141, and on each side by the sector lines 142 and 143. Furthermore, the children nodes of each parent node are compressed with each successive subdivision of the tree 160 to fit within the sector 140 and within the respective concentric ring of the tree tunnel 100. For instance, each arc sector that corresponds to each successive branch of the tree 160 is smaller than the parent node from which the branch originated so that all siblings nodes within the branch fit between the sector lines 142 and 143. For example, in the tree tunnel 100, the descendants of node 101 are sized so that they stay between the sector line 142 and the sector line 143. In other examples, such as the tree tunnel 100 shown in FIG. 1D, the tool 150 can be configured to cause at least some descendant nodes to be even smaller in dimension (e.g., smaller in width) such that each set of child nodes still remains within given sector lines of the parent node, but in some instances would not extend to or touch sector lines. For instance, in FIG. 1D, a height 190 of the nodes 108 and 109 are the same as in FIGS. 1A and 1C, however, a width 191 of the nodes 108 and 109 are smaller. By making each successive child node smaller as shown in FIG. 1D, the distinction between the branches becomes more apparent as negative, or empty, spaces (e.g., spaces 180) appear between branches.

Figure 2:
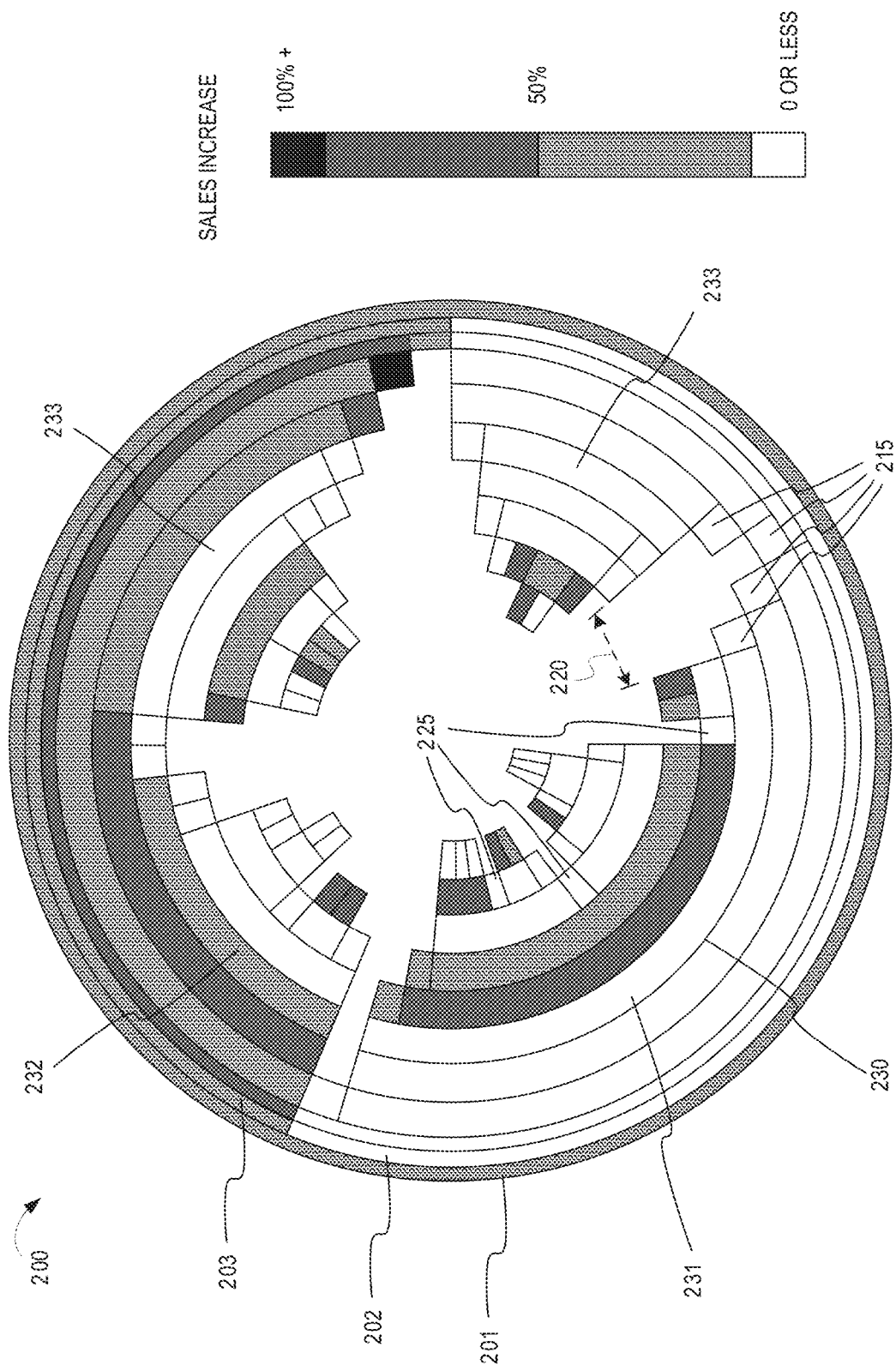
FIG. 2 depicts an example tree tunnel 200 with some nodes having variable sized dimensions and visual indicators.

FIG. 2 is an illustration of a tree tunnel 200 with some nodes having variable sized dimensions and visual indicators. In FIG. 2, a data visualization tool generates and assigns an outermost ring of the tree tunnel structure 200 to a root node 201. The next outermost ring, which includes nodes 202 and 203, are the level of nodes at the base of the tree after the root node 201. Furthermore, the tool can be configured to display some nodes with smaller heights (i.e., thicknesses) than other nodes. For example, rings associated with nodes 201, 202, and 203 are thinner than some other rings. By making some rings and nodes thinner, the thinner nodes can be visually deemphasized, and the visual emphasis can be shifted to the nodes in thicker rings, such as the nodes closer to the middle of the tree tunnel 200. In some instances, the tool can make certain rings smaller based on user input, such as in response to activation of a zoom feature that focuses the view away from the outer rings toward the inner rings. This can cause the inner nodes to appear larger.

In other instances, the tool can automatically determine whether to cause certain rings to be thinner. For example, the tool can analyze the hierarchy data based on a certain criterion and determine which levels in the hierarchy are significant based on the criterion. For example, the tool can determine which parts of the hierarchy have significant densities and/or variations in the values of the nodes (e.g., high cost values, high profit values, etc.). In response to determining which levels meet the criterion, the tool automatically determines that a certain corresponding section, or sections, of the tree tunnel 200 may be more significant or of greater potential interest. As a result, the tool can automatically cause the corresponding sections of the tree tunnel 200 (e.g., the rings that are more significant or of potential interest) to be visually thicker than other sections. In some instance, the tool determines the criterion (or criteria) based on user input that indicates a preference for a certain portion(s) of the tree data. For instance, the tool can present a user input control (e.g., a search control, a slider control, etc.) within a user interface, which the user can utilize to indicate a portion of the hierarchy data of interest. The tool automatically determines the section of the tree tunnel 200 that corresponds to the indicated portion of the hierarchy data, and the tool automatically emphasizes that portion of the tree tunnel 200, such as using thicker rings.

The tool can utilize other visual indicators to emphasize the sections of the tree tunnel 200 that may be more significant or of greater interest, such as colors, three-dimensional effects, textures, etc. For instance, the tool applies certain colors to the nodes of the tree tunnel 200 based on certain properties, variables, characteristics, metrics, etc. of the tree data (e.g., parts of the hierarchy having significant densities and/or variations in the values of the nodes, high or low values based on a certain criterion, increases in a data type over a certain time period, etc.). In some instances, the tool can also hide certain sections of the tree tunnel 200, such as hiding certain circle sectors, hiding certain rings, hiding certain branches or leafs, etc. In some instances, certain portions of the tree tunnel 200 may be hidden based on a portion or portions of the hierarchy data selected for exclusion, such as for filtered trees where the smallest nodes may be visually excluded.

Furthermore, as shown in FIG. 2, the tool can be configured to dynamically position within a tree ring some sibling nodes that have no children so that they create a separation between certain branches. For example, the tool positions a set of nodes 215, which have no children, on the outside edges of certain branches within certain tree rings. This causes a separation 220 to form, creating a negative space that helps to visually distinguish the branches. Furthermore, the tool positions another set of nodes 225 between certain branches to create additional negative space, and further visual distinction, between branches.

Figure 3A:
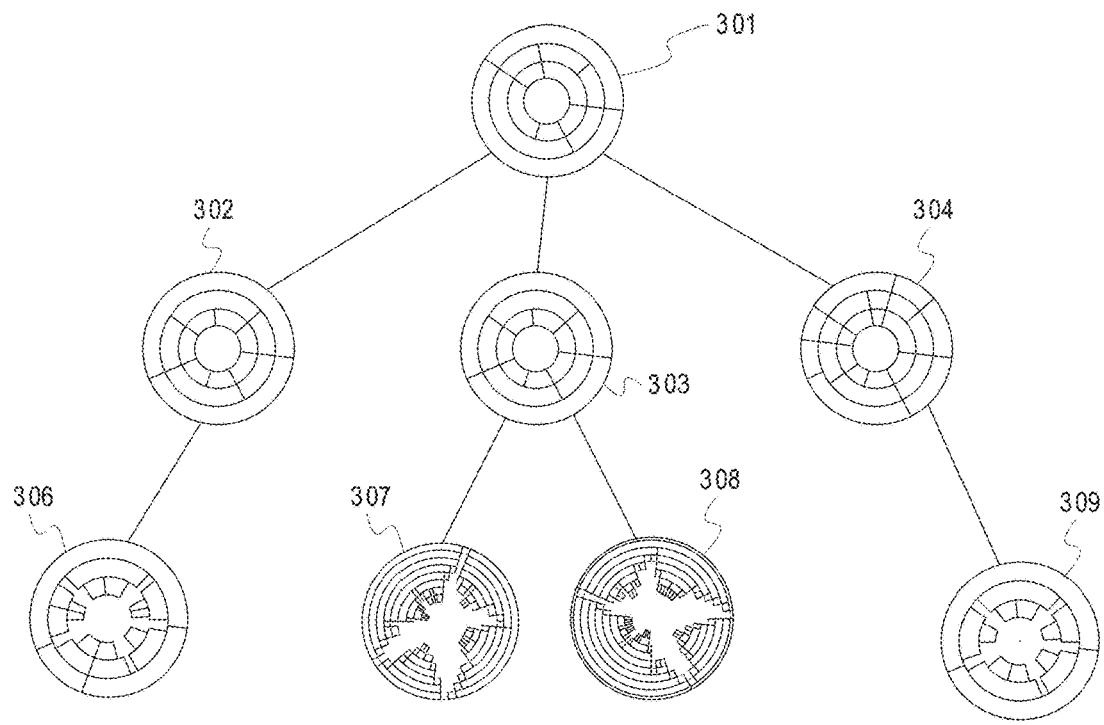
FIG. 3A depicts an example of using tree tunnels in a node-link diagram.

In some instances, tree tunnels can be used as glyphs within other types of visualizations, such as grid tables, node-link diagrams, etc. FIG. 3A depicts an example of using tree tunnels in a node-link diagram. The node-link diagram has certain levels of a first hierarchy, such as geographic divisions. The tree tunnel 301 may include hierarchical sales data for a first level geographical division (e.g., United States (US) sales). The tree tunnels 302, 303, and 304 may include separate sales data hierarchies for second level geographical divisions (e.g., Eastern Region of the US, Pacific North West Region of the US, and South West Region of the US). Tree tunnels 306, 307, 308, and 309 show hierarchical sales data for additional geographic subdivisions.

Figure 3B:
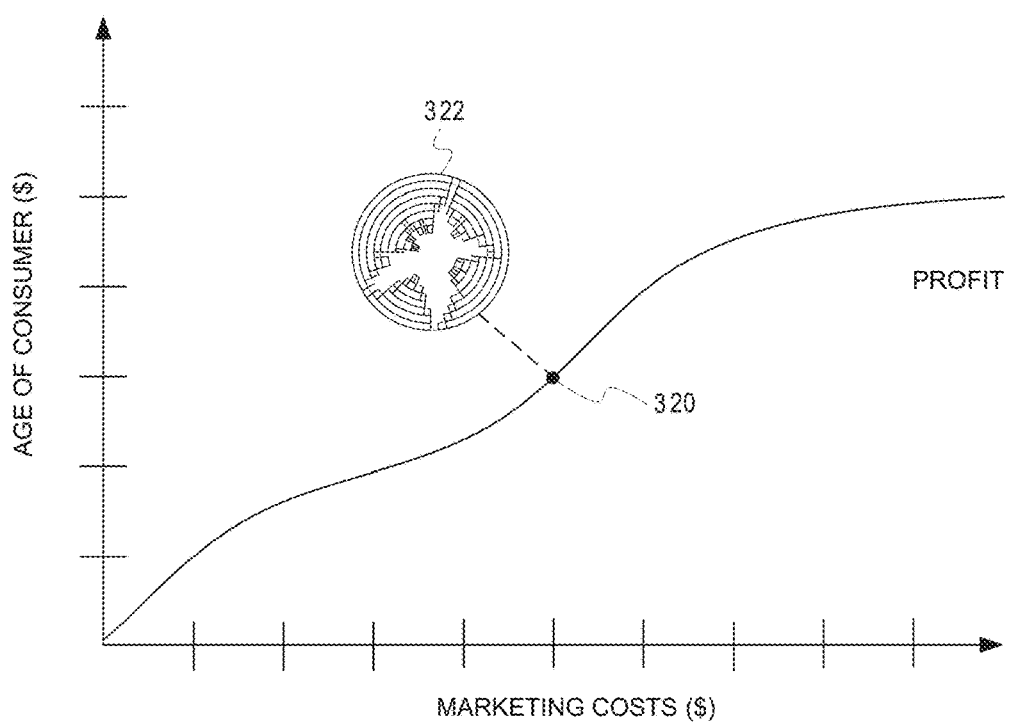
FIG. 3B depicts an example of using tree tunnels in a graph.

In other examples, tree tunnels can be used in any type of visualization, whether the visualization has a hierarchical structure or not. The tree tunnels can show a hierarchical visualization of sets of data points or sets of data points in the visualization, such as in a table or graph, such as the graph shown in FIG. 3B. In FIG. 3B, a graph shows an amount of quarterly profit generated for an organization based on the amounts of marketing costs and an age of a consumer. For any given amount of marketing cost or age of the consumer (such as for point 320), a tree tunnel 322 can be presented to show a related hierarchical set of data. For instance, the set of data may be degrees of sales per inventory type, where the inventory type is shown as the nodes of the tree tunnel 322 and each node is color coded to show the degree of sales for that inventory type.

Figure 4:
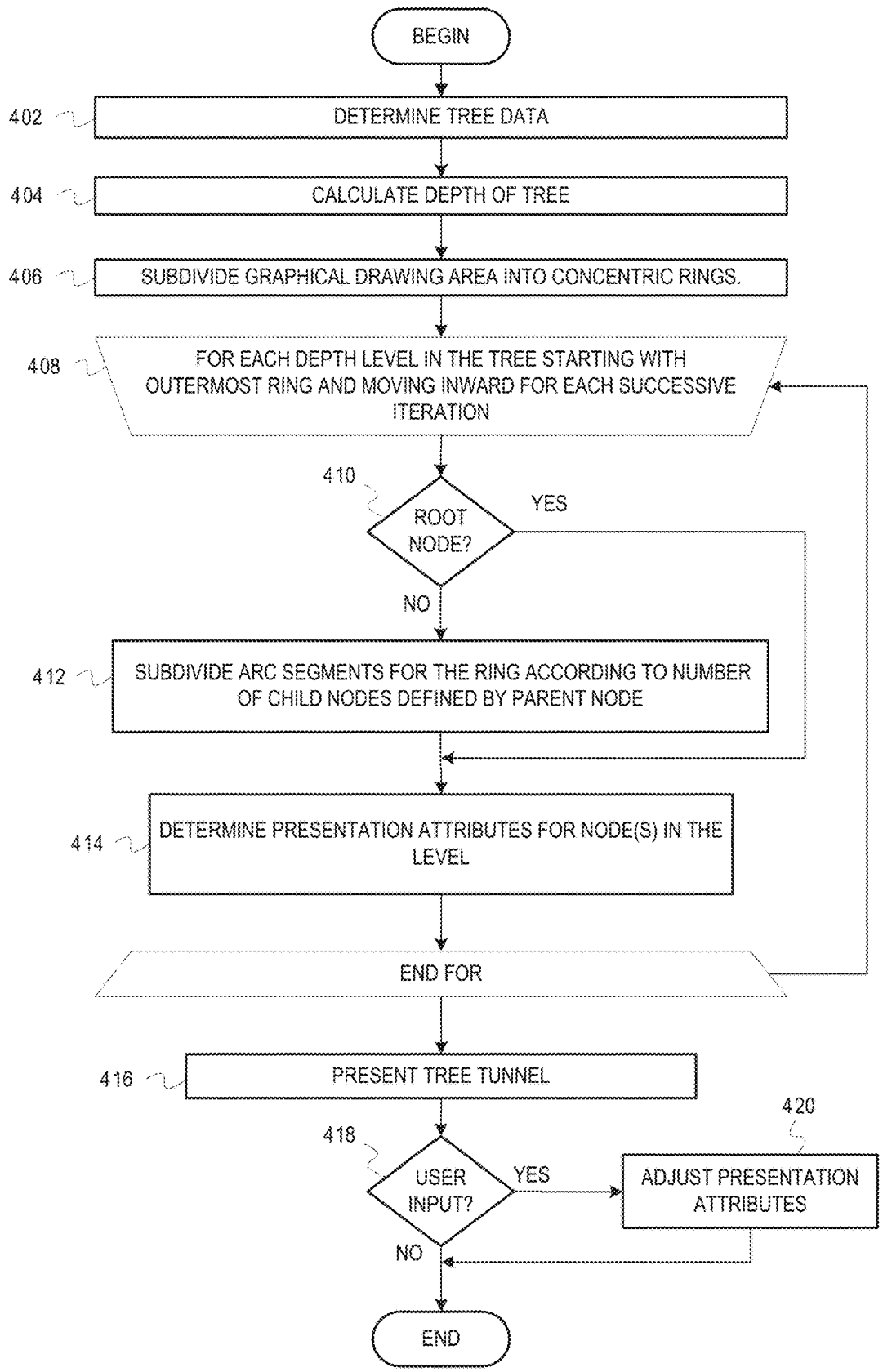
FIG. 4 is an example flow diagram of generating a tree tunnel.
Figure 5B:
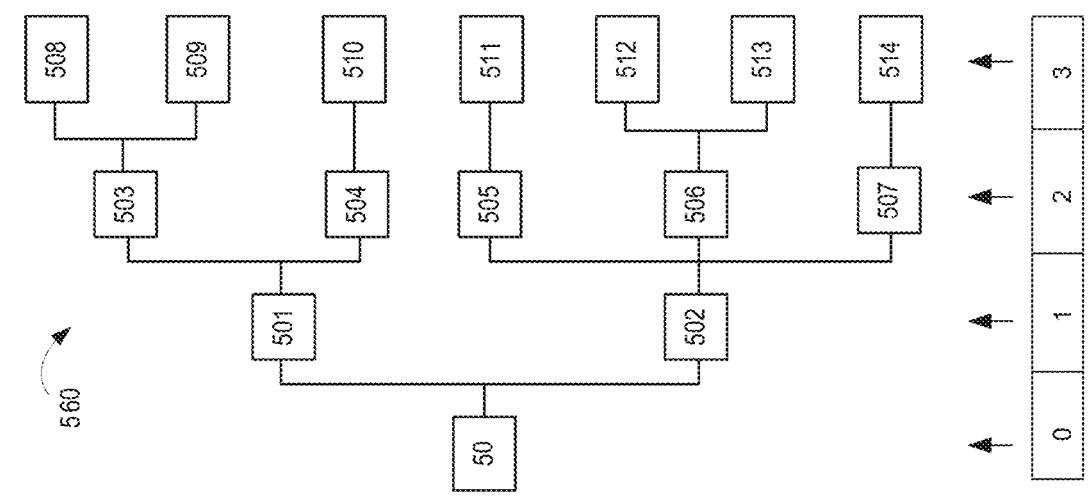
FIG. 5B depicts a tree 560 corresponding to tree tunnel 500.
Figure 5A:
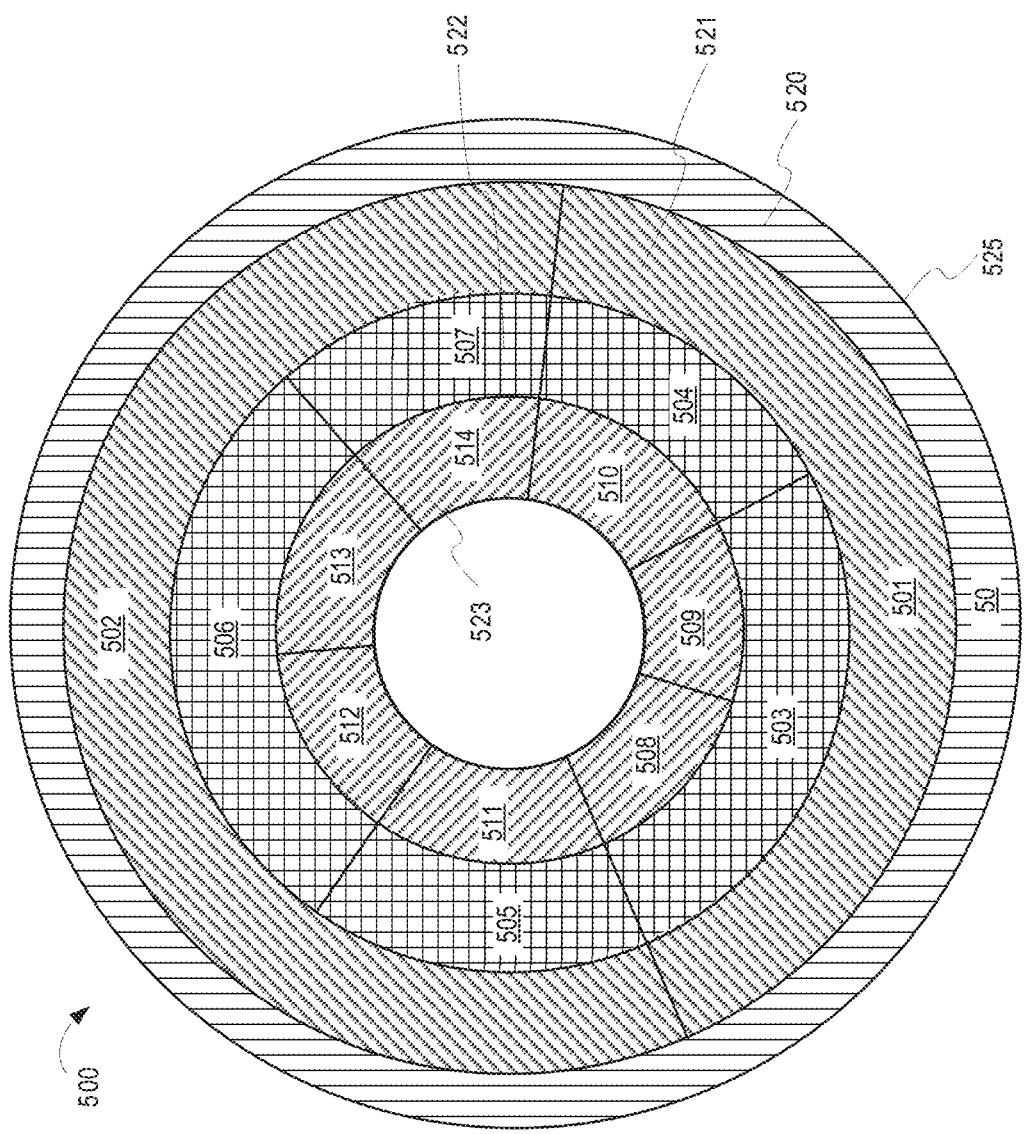
FIG. 5A depicts constructing a tree tunnel 500.

FIG. 4 is an example flow diagram ("flow") 400 of generating a tree tunnel. FIGS. 5A and 5B show the example tree tunnel 100 and a corresponding tree 560. FIG. 4 and FIGS. 5A and 5B will be described concurrently to describe the flow 400. The description of FIG. 4 may also refer to other figures already discussed. In FIG. 4, the flow 400 begins at processing block 402 where a data visualization tool ("tool") determines tree data. For instance, the tool reads from a computer memory data for a tree, which includes a hierarchical relationship between various nodes of the tree. FIG. 5B shows an example of a tree 560.

Referring again to FIG. 4, the flow 400 continues at processing block 404 where the tool calculates a depth of the tree. For instance, in FIG. 5B, the tool counts the depth levels in the tree 560 and determines that there are four depth levels. Node 50 is in the root level (e.g., depth level "0"). Nodes 501 and 502 are in the next depth level (e.g., depth level "1"). Nodes 503, 504, 505, 506, and 507 are in the next depth level (e.g., depth level "2"). Nodes 508, 509, 510, 511, 512, 513, and 514 are in the final depth level (e.g., depth level "3"). The numerical depth levels "0," "1," "2," and "3" are used in this example to follow a nomenclature convention for tree data structures to define a level of a node by the value of "1" plus the number of connections between the node and the root. Thus, the root node is considered the "zero" level node. Furthermore, when referring to the depth levels of a tree, the root level (or zero level) is considered the "highest" or "top" level, and each successive depth level, though increasing by one in numerical value (according to the convention), is considered a successively "lower" level.

The flow 400 continues at processing block 406 where the tool subdivides a graphical drawing area for the tree tunnel into a number of concentric rings equivalent to the depth level. The graphical drawing area may be a plotting area that corresponds to a portion of a visualization graphic that will be presented on an electronic display device. For instance, in FIG. 5A, the tool subdivides a plotting area for the tree tunnel 500 into the rings 520, 521, 522, and 523 illustrated by different textures. The plotting area is the area contained within the circle 525.

Referring back to FIG. 4, the flow 400 continues at processing block 408 which begins a loop (e.g. a "for" loop) that repeats for each incrementing depth level of the tree. For instance, the tool begins at an initial increment value for the loop (e.g., "0"). Each successive time the loop repeats, the increment value can increase (e.g., increase by "1" for each iteration). Each successive iteration corresponds to a next concentric ring inward from the last. In FIG. 5A, for instance, the loop begins with the first ring 520.

Referring back to FIG. 4, the flow 400 continues at processing block 410, where the tool determines whether the current depth level is for the root node of the tree. If the depth level corresponds to the root node, the flow 400 continues at processing block 414 wherein the tool determines presentation attributes for the node(s) in the level. Otherwise, the flow 400 continues at processing block 412 where the tool subdivides arc segments for the ring according to a number of child nodes defined by a parent. For instance, in the example of FIG. 5A, the root node is depicted as the first ling 520. No portion of the first ring 520 is subdivided because there is only one root node. Thus, in the first iteration of the loop, the tool determines that the current depth level corresponded to the root node and, hence, skipped over processing block 412, and did not subdivide the first ring 520. In other iterations of the loop, however, the tool performs the operations for processing block 412. For instance, for a second iteration of the loop, the tool subdivides the ring 521 into two circular segments that correspond to nodes 501 and 502. In a third iteration of the loop, the tool subdivides the ring 522 into five circle segments that correspond to nodes 503, 504, 505, 506 and 507. In the fourth, and final, iteration of the loop, the tool subdivides the ring 523 into seven circle segments. The circle segments are portions of the ring that fit within the circular arc sector defined by an arc of a border of the parent node.

Referring again to FIG. 4, at processing block, 414, the flow 400 continues at processing block 414, where the tool determines presentation attributes for the nodes within the depth level. For example, the tool may determine whether certain colors, textures, three-dimensional (3D) depth, etc. should be applied to certain nodes. The tool may further determine whether a ring, or nodes within a ring, should be a certain height or thickness based on analysis of the tree data, as mentioned previously in the discussion of FIG. 2. For example, as shown in FIGS. 1A, 1C and 1D, the thickness of a ring for the root node 10 was shrunk to a circle that coincides with the outermost border 125. In FIG. 2, three outermost rings of the tree tunnel 200 have a smaller thickness than other rings of the tree tunnel 200.

The tool may further set node spacing and/or dimensions. For example, the tool can determine to shorten the width of certain nodes, as mentioned previously in the discussion of FIG. 1D. In some examples, the tool can set the widths of node subdivisions within a depth level proportional to an amount of children that the node will have. For instance, in FIG. 5A, when the loop is in the second iteration, the tool can analyze the tree data and determine that the node 501 has only two children whereas node 502 has three children. Therefore, the tool can size the two subdivisions of the ring 521 so that the node 501 has a width that is two-fifths of the entire ring 521 and the node 502 has a width that is three-fifths of the entire ring 521.

In other examples, the tool can also set the widths of the nodes within the depth level, and/or strategically position nodes, based on an analysis of all descendants for a given node within the layer. For example, referring back to FIG. 2, the tool subdivides the sixth ring 230 into nine different subdivisions because there are nine nodes within the sixth ring 230. However, the tool can also assess the total number of descendants of each of those nine nodes to determine the widths of each of the nodes. For instance, node 231 has twenty-nine descendants in total. Nodes 232 and 233 have fourteen descendants each. Node 233 has eleven descendants. All other nodes in the sixth ring 230 have no descendants. Therefore, tool causes the size of node 231 to take up the most amount of space in the sixth ring 230 of all of the nodes in that depth level. Nodes 232 and 233 would take up the next most amount of space, followed by node 234. Finally, all of the non-child nodes in the sixth ring 230 are sized much smaller to create negative or empty spaces between branches.

In yet other instances, the tool can set the size of the nodes based on other information, such as certain metrics associated with the nodes. For example, the width of a given node may be based on an amount of sales for a category, a degree of inventory for a classification, etc. For instance, if a particular branch of data has a greater significance or degree of relevance than other branches, then the tool can size some of the nodes from that particular branch to be greater than nodes for other branches regardless of the number of descendants in the branch.

It should be noted that in some instances, the tool can determine presentation attributes before the loop begins. For instance, the tool can determine, concurrently with processing block 406, a thickness for some, or all, of the concentric rings and set the ring widths for the tree tunnel before the loop begins.

Referring back to FIG. 4, after the loop repeats for a number of iterations equivalent to the depth level of the tree, the flow 400 then continues at processing block 416, where the tool presents the tree tunnel. For example, the tool graphically generates and presents the tree tunnel via an electronic display device according to the concentric rings within the plotting area, the subdivided arc segments for the children nodes, and the presentation attributes for each node.

The flow 400 continues at processing block 418 where the tool determines whether user input is received regarding the tree tunnel. For instance, as mentioned previously, a user may utilize a user input control to zoom inward or outward on the tree tunnel and/or to specify a certain portion of the tree data on which to focus. If the tool detects the user input, the flow 400 continues at processing block 420, wherein the tool adjusts the presentation attributes, such as the ring thicknesses, node dimensions, node coloring, etc.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
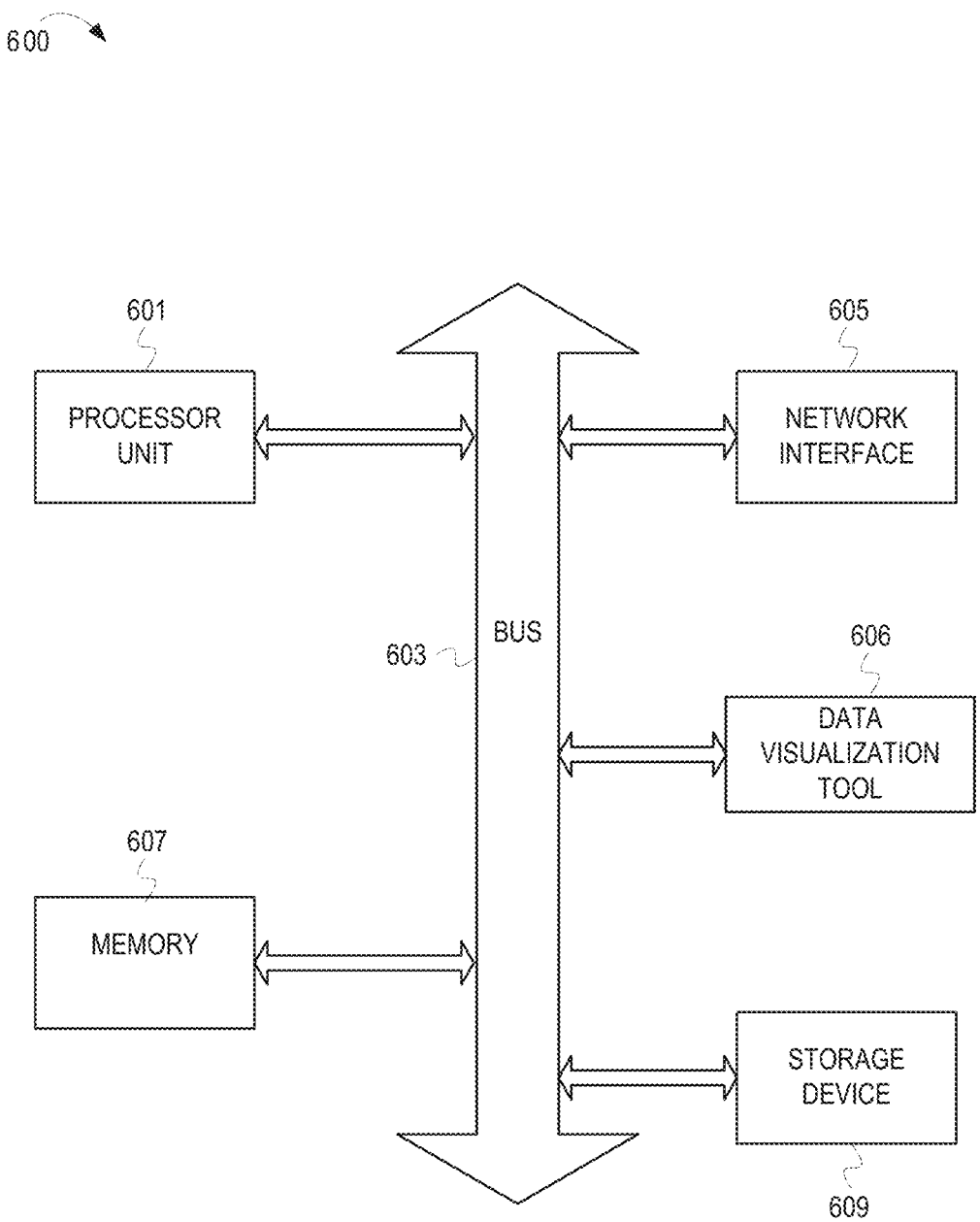
FIG. 6 depicts an example computer system 600.

FIG. 6 is an example illustration of a computer system 600. The computer system 600 includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The memory 607 embodies functionality to implement embodiments described above. The memory 607 may include one or more functionalities that facilitate establishing significance of static analysis results as described above. For example, the memory 607 may include, or have access to, a data visualization tool 606. The data visualization tool 606 generates an outside-in hierarchical data visualization as described herein. Any one of the functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601. Some, or all, portions of the computer system 600 may comprise a data visualization tool.

Figure 7:
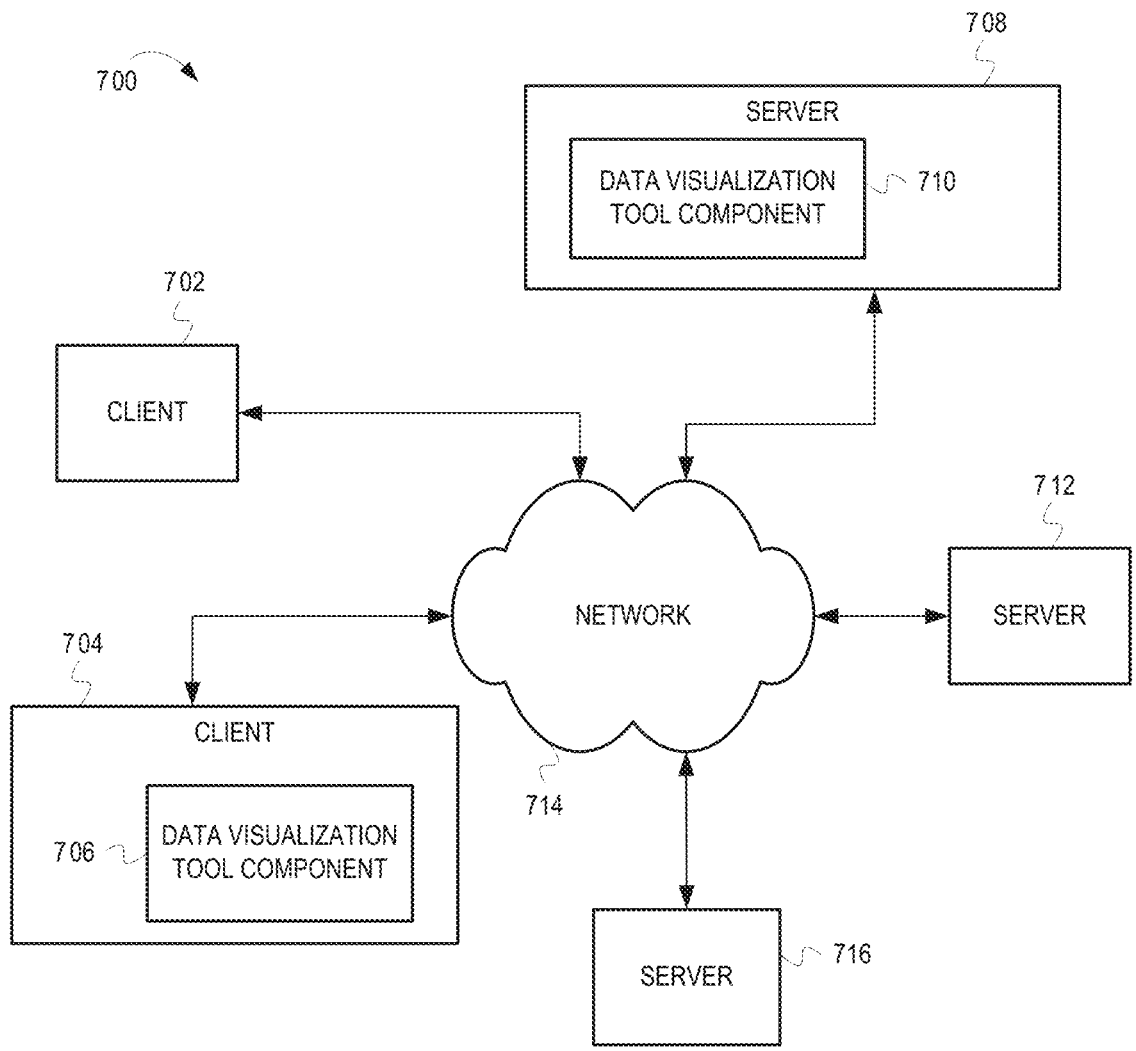
FIG. 7 depicts an example computer network 700.

FIG. 7 is a block diagram of an example network environment 700, according to some embodiments of the invention. The network environment 700 can include multiple client devices ("clients") 702 and 704 connected to multiple servers 708, 712 and 716 via a network 714. The network 714 can be a local area network (LAN), a wide area network (WAN), a telephone network, such as the Public Switched Telephone Network (PSTN), an intranet, the Internet, or a combination of networks. For simplicity, the network environment 700 shows only two clients 702 and 704 and three servers 708, 712, and 716 connected to the network 714. A data visualization tool comprising a data visualization tool component 706 and/or data visualization tool component 710 may be embodied in one or more of the devices, possibly including one or more of the clients 702 and 704 or in a server, such as the server 708. According to some embodiments, the data visualization tool (one or more of data visualization tool component 706 and/or data visualization tool component 710) generates an outside-in hierarchical data visualization as described herein. In practice, there may be a different number of clients and servers. In addition, in some instances, a client may perform the functions of a server and a server may perform the functions of a client. Any one of the clients 702, 704 and servers 708, 712, and 716 can be embodied as the computer system 600 described in FIG. 6. The clients 702 and 704 can be mainframes, minicomputers, personal computers, laptops, personal digital assistants, or the like. Additionally, the clients 702 and 704 may be capable of connecting to the network 714. The clients 702 and 704 may transmit data over the network 714 or receive data from the network 714 via a wired, wireless, optical, or other connection.

While the embodiments are described with reference to various implementations and exploitations, it will be understood that these embodiments are illustrative and that the scope of the inventive subject matter is not limited to them. In general, techniques for generating an outside-in hierarchical data visualization as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of generating a data visualization for tree data comprising:

calculating, via an electronic processor associated with a data visualization tool, a number of hierarchical levels of the tree data;

subdividing, via the electronic processor associated with the data visualization tool, a presentation area for the data visualization into a number of concentric rings equivalent to the number of hierarchical levels, wherein lines delineate each of the concentric rings and one or more elements of the tree data associated with each of the concentric rings, and wherein each of the concentric rings corresponds to one of the hierarchical levels of the tree data;

graphically generating, via the electronic processor associated with the data visualization tool, the data visualization for presentation via a graphical user interface on an electronic display, wherein a first of the concentric rings that corresponds to a highest of the hierarchal levels is an outermost one of the concentric rings in the presentation area, wherein each successive concentric ring inward corresponds to a next lower hierarchical level, and wherein thickness of the lines varies according to a degree of user interest in a portion of the hierarchical levels of the tree data; and creating, via the electronic processor associated with the data visualization tool, one or more visual separations between any number of the concentric rings by positioning a plurality of sibling nodes against one or more outside edges of each of the concentric rings, wherein the plurality of sibling nodes have no child nodes, and wherein the one or more visual separations are open areas, located between the first of the concentric rings and the outermost one of the concentric rings, oriented inward towards the first of the concentric rings.

2. The method of claim 1 further comprising:
subdividing each concentric part having two or more nodes according to a number of nodes within a hierarchical level that corresponds to the concentric part.

3. The method of claim 1, wherein the graphically generating the data visualization comprising causing an outer border of any child node to touch an inner border of a parent node for the child node.

4. The method of claim 1 further comprising determining the degree of significance for the portion of the tree data based on one or more of automated analysis of the tree data according to a given criterion and user input that specifies the portion of the tree data.

5. The method of claim 1 further comprising:
determining, for each node of the tree data, corresponding values of a metric associated with the tree data; and
setting presentation attributes in the data visualization for the each node based on the corresponding values of the metric, wherein the presentation attributes comprise one or more of a color, a texture, and a three-dimensional depth.

6. The method of claim 1, wherein calculating a number of hierarchical levels of the tree data further comprises:
defining, via the electronic processor associated with the data visualization tool, the number of hierarchical levels of the tree data as a numerical depth level from a root level.

7. The method of claim 6, wherein the root level is a value of zero and each incrementing depth level from the root level is a value of one plus a number of connections between a node and the root level.

8. A computer program product for determining a significance of static analysis results, the computer program product comprising:
one or more computer-readable storage media and program instructions stored on the one or more computer-readable storage media, the stored program instructions comprising:
program instructions to calculate a number of hierarchical levels of tree data;
program instructions to subdivide a presentation area for a data visualization into a number of concentric rings equivalent to the number of hierarchical levels, wherein lines delineate each of the concentric rings and one or more elements of the tree data associated with each of the concentric rings, and wherein each of the concentric rings corresponds to one of the hierarchical levels of the tree data;
program instructions to graphically generate the data visualization for presentation via a graphical user interface on an electronic display, wherein a first of the concentric rings that corresponds to a highest of the hierarchal levels is an outermost one of the concentric rings in the presentation area, wherein each successive concentric ring inward corresponds to a next lower hierarchical level, and wherein thickness of the lines varies according to a degree of user interest in a portion of the hierarchical levels of the tree data; and
program instructions to create one or more visual separations between any number of the concentric rings by positioning a plurality of sibling nodes against one or more outside edges of each of the concentric rings, wherein the plurality of sibling nodes have no child nodes, and wherein the one or more visual separations are open areas, located between the first of the concentric rings and the outermost one of the concentric rings, oriented inward towards the first of the concentric rings.

9. The computer program product of claim 8, the stored program instructions further comprising:
program instructions to subdivide each concentric ring having two or more nodes according to a number of nodes within a level that corresponds to the concentric ring.

10. The computer program product of claim 8, the stored program instructions further comprising:
program instructions to configure an outer border of any child node to touch an inner border of a parent node for the child node.

11. The computer program product of claim 8, the stored program instructions further comprising:
program instructions to determine the degree of significance for the portion of the tree data based on one or more of automated analysis of the tree data according to a metric and user input that specifies the portion of the tree data.

12. The computer program product of claim 8, wherein the program instructions to calculate a number of hierarchical levels of the tree data further comprise:
program instructions to define, via the electronic processor associated with the data visualization tool, the number of hierarchical levels of the tree data as a numerical depth level from a root level.

13. The computer program product of claim 12, wherein the root level is a value of zero and each incrementing depth level from the root level is a value of one plus a number of connections between a node and the root level.

14. A computer system comprising:
a processor associated with a data visualization tool;
one or more computer readable storage medium; and
program instructions stored on the computer readable storage medium for execution by at least the processor associated with the data visualization tool, the stored program instructions comprising:
program instructions to calculate a number of hierarchical levels of tree data;
program instructions to subdivide a presentation area for a data visualization into a number of concentric rings equivalent to the number of hierarchical levels, wherein lines delineate each of the concentric rings and one or more elements of the tree data associated with each of the concentric rings, and wherein each of the concentric rings corresponds to one of the hierarchical levels;
program instructions to graphically generate the data visualization for presentation via a graphical user interface on an electronic display, wherein a first of the concentric rings that corresponds to a highest of the hierarchal levels is an outermost one of the concentric rings in the presentation area, wherein each successive concentric ring inward corresponds to a next lower hierarchical level, and wherein thickness of the lines varies according to a degree of user interest in a portion of the hierarchical levels of the tree data; and
program instructions to create one or more visual separations between any number of the concentric rings by positioning a plurality of sibling nodes against one or more outside edges of each of the concentric rings, wherein the plurality of sibling nodes have no child nodes, and wherein the one or more visual separations are open areas, located between the first of the concentric rings and the outermost one of the concentric rings, oriented inward towards the first of the concentric rings.

15. The computer system of claim 14, wherein the stored program instructions further comprise:
    program instructions to subdivide each concentric part having two or more nodes according to a number of nodes within a hierarchical level that corresponds to the concentric part.

16. The computer system of claim 14, wherein the stored program instructions further comprise:
    program instructions to configure an outer border of any child node to touch an inner border of a parent node for the child node.

17. The computer system of claim 14, wherein the stored program instructions further comprise:
    program instructions to determine the degree of significance for the portion of the tree data based on one or more of automated analysis of the tree data according to a given criterion and user input that specifies the portion of the tree data.

18. The computer system of claim 14, wherein the stored program instructions further comprise:
    program instructions to determine, for each node of the tree data, corresponding values of a metric associated with the tree data; and
    program instructions to set presentation attributes in the data visualization for the each node based on the corresponding values of the metric, wherein the presentation attributes comprise one or more of a color, a texture, and a three-dimensional depth.

19. The computer system of claim 14, wherein the program instructions to calculate a number of hierarchical levels of the tree data further comprise:
    program instructions to define the number of hierarchical levels of the tree data as a numerical depth level from a root level.

20. The computer system of claim 19, wherein the root level is a value of zero and each incrementing depth level from the root level is a value of one plus a number of connections between a node and the root level.

* * * * *